UNITED STATES PATENT OFFICE.

HENRY F. EVANS, OF WICHITA FALLS, TEXAS.

FISH-BAIT.

1,185,894.      Specification of Letters Patent.      Patented June 6, 1916.

No Drawing.      Application filed July 20, 1915. Serial No. 40,844.

*To all whom it may concern:*

Be it known that I, HENRY F. EVANS, a citizen of the United States, residing at Wichita Falls, in the county of Wichita and State of Texas, have invented certain new and useful Improvements in Fish-Bait, of which the following is a specification.

My invention has relation to an improvement in fish-bait and the method of preparing the same and in such connection it relates more particularly to a liquid bait formed from minnows or similar small fish which after washing and cleaning are dried in a shady, cool place for a considerable length of time.

My invention has for its object to provide an economical, satisfactory and easily transportable fish-bait for the use of anglers, the bait being in liquid form and derived from minnows or similar small fry, which bait is placed upon a sponge secured to the hook.

In the carrying out of my invention the minnows are first caught in nets or otherwise and then properly cleaned and washed in fresh or salt water. The fish so prepared are then placed in a bucket or vessel with a foraminous or perforated bottom and allowed to drain. The drained fish are then exposed to the air in a receptacle or place thoroughly shaded, relatively cool and screened from flies or insects. This exposure to the air is kept up until the fish are converted into an oleaginous mass. The length of time necessary to so convert the cleaned fish to a liquid or semi-liquid state is approximately eight days and when the operation is completed, the fish bait is ready for use.

In using the bait, the oily mass is stirred up and spread upon a piece of sponge which in turn is impaled on the barb of the hook.

The bait when prepared may be shipped to any distance and may be used in all climates, and for fresh or salt water fishing.

Having thus described the nature and object of my invention what I claim as new and desire to secure by Letters Patent, is,—

1. A product constituting a fish-bait and consisting of minnows cleaned, washed, and reduced to an oleaginous mass.

2. A fish bait consisting of a sponge and an oleaginous mass applied thereto, said mass consisting of minnows cleaned, washed and exposed to the air out of direct exposure to the sun.

3. A process of preparing fish bait which consists in cleaning and washing minnows and thereafter draining the same and subjecting the drained fish, in a screened receptacle, to the air for a period of time necessary to reduce the fish to an oleaginous mass.

In testimony whereof I have signed my name to this specification in the presence of two subscribing witnesses.

HENRY F. EVANS.

Witnesses:
  SIE EVANS,
  GEORG DURON.